United States Patent [19]

Bährle et al.

[11] 4,389,945
[45] Jun. 28, 1983

[54] TRANSVERSE GUIDE ROLLER ARRANGEMENT FOR A TRACK GUIDED VEHICLE

[75] Inventors: Friedrich Bährle, Kernen-Rommelshausen; Hellmuth Binder; Wolfram Meyer, both of Stuttgart; Helmut Wulf, Ostfildern, all of Fed. Rep. of Germany

[73] Assignee: Daimler-Benz Aktiengesellschaft, Stuttgart, Fed. Rep. of Germany

[21] Appl. No.: 183,101

[22] Filed: Sep. 2, 1980

[30] Foreign Application Priority Data

Sep. 1, 1979 [DE] Fed. Rep. of Germany ....... 2935386

[51] Int. Cl.³ .......................... B61B 12/02; B61F 9/00
[52] U.S. Cl. ............................. 104/247; 301/105 R; 301/132; 280/157
[58] Field of Search .................. 104/118–120, 104/245, 247; 105/141, 144, 145; 301/385, 63 DS, 95, 96, 126, 131–136, 105 R; 280/96.1, 156, 157; 152/378 R, 403, 404

[56] References Cited

U.S. PATENT DOCUMENTS

| 907,847 | 12/1908 | Molesworth et al. ............. 301/385 |
| 2,771,147 | 11/1956 | Ash ................................ 301/126 X |
| 2,882,063 | 4/1959 | Strasel ............................ 301/132 X |
| 3,012,825 | 12/1961 | Bullens ............................ 301/132 |
| 3,099,491 | 7/1963 | Péras .............................. 104/247 X |
| 3,574,408 | 4/1971 | Ronning ............................ 301/132 |
| 4,123,112 | 10/1978 | Mills ............................ 301/63 DS X |
| 4,132,175 | 1/1979 | Miller et al. ..................... 104/247 X |
| 4,265,180 | 5/1981 | Uozumi ........................... 104/119 X |
| 4,287,830 | 9/1981 | Braun et al. ....................... 104/247 |

FOREIGN PATENT DOCUMENTS 2641637 3/1978 Fed. Rep. of Germany .
77494 3/1931 Sweden .......................... 301/105 R Primary Examiner—Randolph Reese
Attorney, Agent, or Firm—Craig & Burns

[57] ABSTRACT

A transverse guide roller arrangement for a vehicle which can be guided mechanically along a guide track or the like provided on the side of a lane. The transverse guide roller arrangement includes at least one rolling surface which is approximately vertical when the guide roller is in an operating position. The rolling surface is formed by a rubber tire mounted on a rim having a hub rotatably supported on a fixed journal attached to an end of a supporting arm or the like. The hub forms radially, without transistion on an outside thereof the rim without a wheel disk, spokes, screw on flange, or the like. The hub and rim are combined structurally into one piece, with the journal being exchangeably attached to the supporting arm.

35 Claims, 4 Drawing Figures

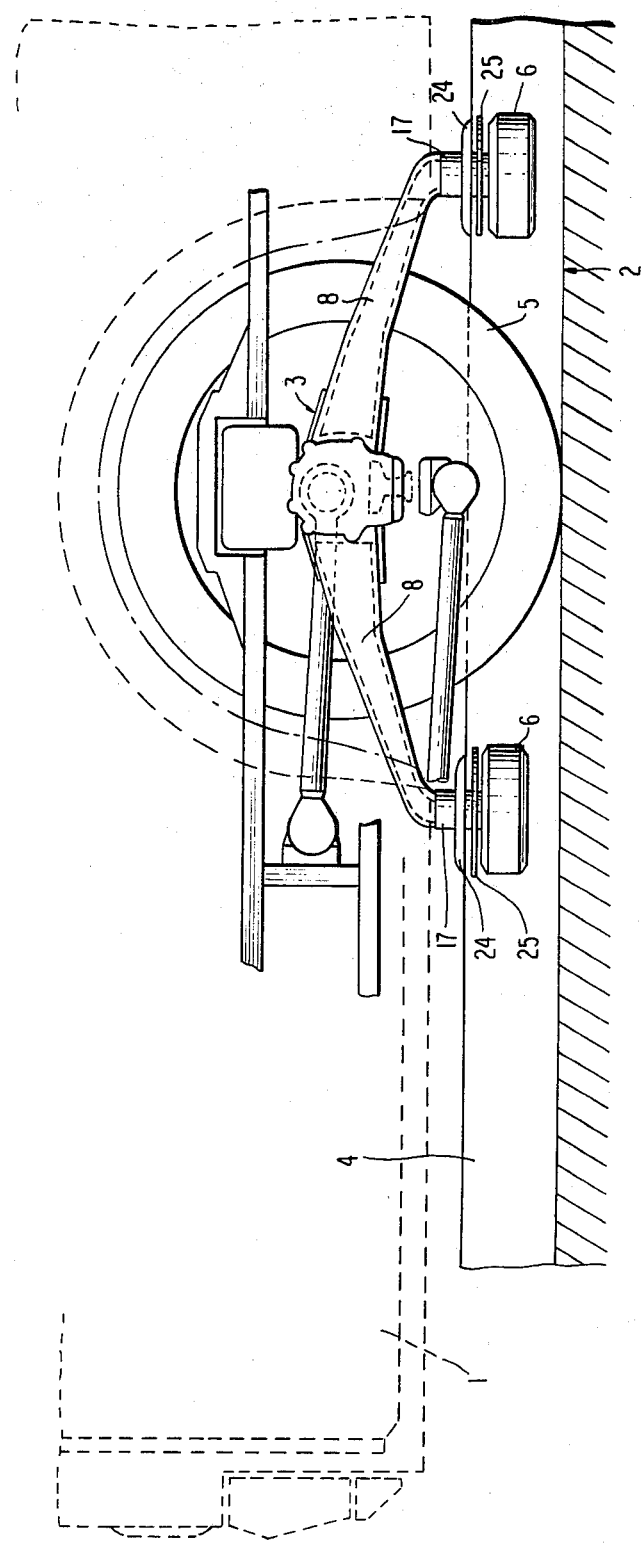
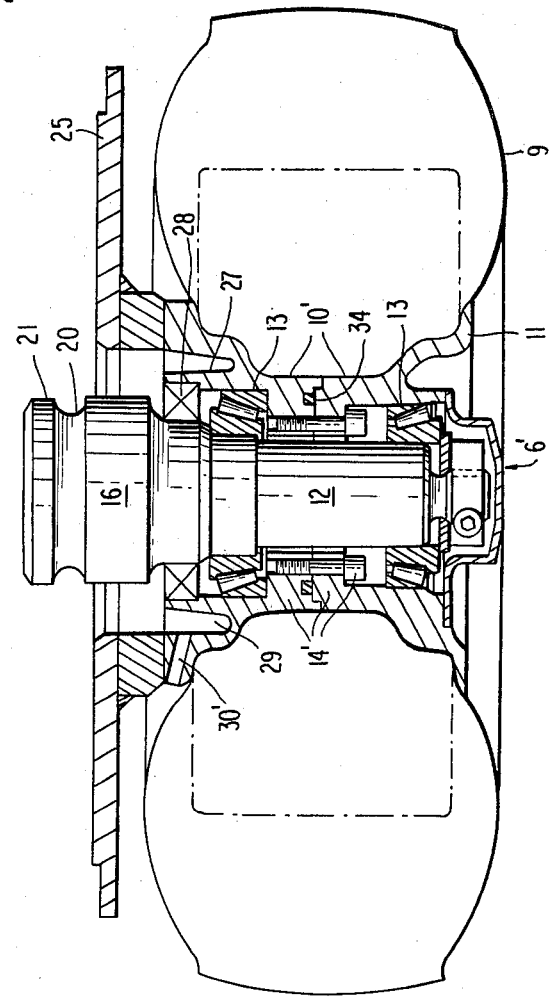
FIG. 1
FIG. 4

TRANSVERSE GUIDE ROLLER ARRANGEMENT FOR A TRACK GUIDED VEHICLE

The present invention relates to a guide roller arrangement and, more particularly, to a transverse guide roller arrangement for a vehicle which is adapted to be mechanically guided along guide bars or the like provided on a side of a lane.

Transverse guide roller arrangements for vehicles which may be mechanically guided along a guide track have been proposed and, for example, in Offenlegungsschrift No. 2,641,637 a guide roller arrangement is provided which includes a rolling surface which is at least approximately vertical in the operating position. The rolling surface is formed by a rubber tire, preferably filled with compressed gas, with a rim carrying the rubber tire and with a hub rotatably supported on a fixed journal attached to an end of a supporting arm or the like.

The installation space for accommodating transverse guide rollers in buses or the like adapted to be guided along a track is extremely restricted. On the other hand, the transverse guide rollers must be capable of absorbing transverse forces that are, in part, quite considerable. Moreover, the transverse guide rollers must be capable of offering a certain transverse comfort by being provided with the pneumatic tires and, in case of a wear of the tire or, for example, a flat tire, the transverse guide roller must have the capabilities of being readily exchangeable. The small installation space on the one hand and exchangeability of the pneumatic tire and high tire and bearing stresses, on the other hand, are two requirements which oppose each other, since the exchangeability of the pneumatic tire as well as a certain miminum load bearing capacity of the tire and bearings lead to a certain miminum structural size of the overall transverse guide roller.

The aim underlying the present invention essentially resides in providing a transverse guide roller arrangement for vehicles which are adapted to be mechanically guided along guide rails or the like which minimizes the necessary installation space but yet enables an exchangeability of the roller and meets the minimum load bearing capacity necessary to ensure a safe operation of the transverse guide roller arrangement.

In accordance with advantageous features of the present invention, a hub of the transverse guide roller forms radially, without transition, that is, without a wheel disc, spokes, screw-on flanges, or the like, directly on its outside the rim and is combined with the latter structurally into one piece, with a journal being exchangeably attached to the supporting arm of the guide roller arrangement.

Due to the constructional combination of the rim and hub into a tubular part similar to bobbin, wherein the inside represents the hub and the outside represents the rim, the wheel is reduced to a minimum radial dimension. To enable a rapid change of the transverse guide roller if, for example, the tire wears or becomes flat, the transverse guide roller is exchanged together with its rotary bearing for which purpose the journal is attached to the supporting arm to be exchangeable. Naturally, the spare roller or tire carried in the vehicle is also provided with a ready-mounted rotary bearing with journal.

In order to facilitate a mounting of the tire of the transverse guide roller, in a transverse guide roller arrangement provided with two antifriction bearings arranged axially at a spacing on the journal so as to provide a rotary bearing for the hub, the hub wall bulges in cross section in order to enter between the two antifriction bearings in order to form a peripheral groove lying approximately centrally in the rim with the groove being deep in cross section and open radially toward the outside in order to receive the lateral tire beads during a mounting of the tire in the manner of a deep-well rim. Additionally, it is also possible in accordance with the present invention, with two antifriction bearings arranged axially at a spacing on the journal for providing a rotary bearing for the hub, to divide the rim/hub unit axially about the center with the parts of the unit being detachably joined together by a preferably sealed flanged screw or threaded connection extending radially toward an inside between the antifriction bearings.

Advantageously, the journal extending axially unilaterally in an upward direction over the rotary bearing of the hub and constituting at that location a holding pin is attached by a plug in connection in the supporting arm with the holding pin and is secure against being pulled out and against twisting.

In accordance with further features of the present invention, a radially slotted clamping eye receiving the holding pin is provided at the supporting arm, with the clamping eye being adapted to close, by means of at least one clamping fastener such as a screw lying at right angles to the slot and tangentially to the clamping eye, to provide for peripheral clamping of the holding pin.

Advantageously, the holding pin is provided with a peripheral groove at an axial location of the clamping screw. The clamping screw, which cuts into the inside cross section of the clamping eye, enters the groove radially with the pin periphery for a shape mating axial fixation of the holding pin in the clamping eye.

In accordance with the present invention, the holding pin may be fashioned to be round and have a larger diameter than the journal in the zone of the antifriction bearings. The holding pin is arranged eccentrically with respect to a center of the hub bearing.

Moreover, the holding pin of the present invention may be provided at least along a partial zone of its periphery and/or an upper end face thereof with a peripherally finally divided axially meshable serration which cooperates with a corresponding counter serration in the clamping eye and serves for a shape mating peripheral securement of the position of the holding pin and/or the journal.

Advantageously, a top side of the transverse guide roller may at least be partially covered by a splash baffle and, at least a portion of the splash baffle may be adapted to be flipped upwardly.

An emergency runner, dimensioned somewhat smaller than the transverse guide roller, may be provided with the emergency runner being attached above the transverse guide roller to a horn of the rim.

Preferably, a seal is arranged above the rotary bearing of the hub with an approximately cylindrical sealing box on the hub side. An upwardly open continuous groove formed between the sealing box and the horn of the rim and/or the rubber tire forming the guide roller is drained in a downward direction by a water drainage pipe extending axially through the walls of the rim of the wheel and its interior in a sealing fashion.

Accordingly, it is an object of the present invention to provide a transverse guide roller arrangement for vehicles which are adapted to be mechanically guided along a guide track which avoids, by simple means, shortcomings and disadvantages encountered in the prior art.

Another object of the present invention resides in providing a transverse guide roller arrangement for vehicles which are adapted to be guided mechanically along a guide track which minimizes the installation space necessary for accommodating the arrangement.

Yet another object of the present invention resides in providing a transverse guide roller arrangement for a vehicle which is adapted to be guided mechanically along a guide track which is capable of absorbing the transverse forces acting thereon so as to ensure an accurate transverse guiding of the vehicle.

A further object of the present invention resides in providing a transverse guide roller for a vehicle adapted to be guided mechanically along guide tracks which enables an exchangeablility of the guide roller in an extremely simple manner.

Yet another object of the present invention resides in providing a transverse guide roller arrangement for a vehicle which is adapted to be mechanically guided along a guide track which is simple in construction and therefore relatively inexpensive to manufacture.

A further object of the present invention resides in providing a transverse guide roller arrangement for a vehicle adapted to be guided mechanically along a guide track which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein:

FIG. 1 is a fragmentary lateral view of a vehicle adapted to be guided mechanically along a guide track by means of a transverse guide roller arrangement constructed in accordance with the present invention;

FIG. 4 is a cross sectional view of another embodiment of a transverse guide roller arrangement in accordance with the present invention with an axially divided rim/hub unit in a completely mounted position.

Figure 2:
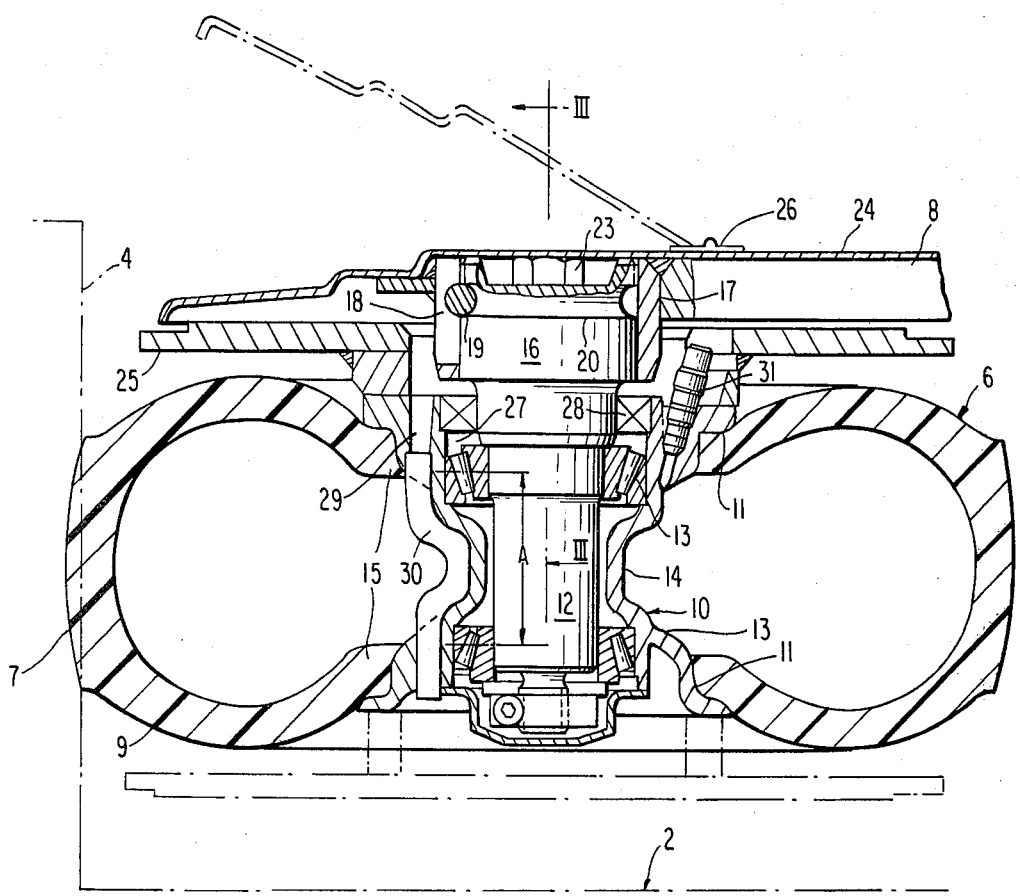
FIG. 2 is a cross sectional view of a first embodiment of a transverse guide roller arrangement in accordance with the present invention.

Referring now to the drawings wherein like reference numerals are used throughout the various views to designate like parts and, more particularly, to FIG. 1, according to this Figure a vehicle 1 rolls by way of associated vehicle wheels 5 along a track or lane 2. The track 2 is provided with vertically extending track-determining transverse guide bars or guide walls arranged on both sides of the track 2 so as to result in a track having a trough-like or channel shaped cross section.

As shown in FIG. 1, one transverse guide roller 6, for example, is mounted by way of supporting arms 8 in a zone of a front axle generally designated by the reference numeral 3 of the vehicle 1, in front of and behind each vehicle wheel 5. The supporting arms 8 and, with them, the transverse guide rollers 6, are supported in a constant relative position with respect to a wheel plane and, accordingly, the guide rollers 6 participate in turning motions of the steerable vehicle wheels 5 of the front axle 3. By virtue of this arrangement, only a very small installation space may be provided for accommodating the transverse guide rollers 6.

The transverse guide rollers 6 are arranged with a vertical axis of rotation and are constructed with a vertically extended rolling surface 7 (FIG. 2) cooperating with the corresponding transverse guide bar 4. To provide for a certain rolling comfort of the transverse guide rollers 6 on the transverse guide bars 4, the transverse guide rollers 6 are equipped with a rubber tire 9 filled with compressed air and having a corresponding load bearing ability. In order to prevent the vehicle 1 from getting out of control in case of a defect in a tire such as a flat or wearing of the tire 9 of the transverse guide roller 6, each of the transverse guide rollers 6 is combined with an emergency runner 25 (FIG. 2) formed of steel.

As shown in FIG. 2, in order to obtain a minimum constructional volume for the transverse guide roller 6, a rim for receiving the rubber tire 9 and the wheel hub are combined into a single bobbin-like part constituting the rim and the hub, which bobbin-like part has no wheel disc, spokes, screw on flanges, or the like. More particularly, the rim and hub form a rim/hub unit generally designated by the reference numeral 10 with the unit being fashioned integrally and undivided. Each unit 10 has, on an axial end face, one rim horn 11 adapted to receive beads 15 of the rubber tire 9.

The rim/hub unit 10 is supported, by means of two antifriction bearings 13, arranged at an axial spacing A from each other, so that the unit 10 is rotatable on a journal 12. The journal 12, in turn, is held on an end of the supporting arm 8. In order to facilitate a quick changing of the tire 9 of the transverse guide roller 6, which is accomplished in, for example, a workshop after a disassembling of the pivot bearing, the wall of the hub bulges radially inwardly between the two antifriction bearings 13 so as to form a pheripheral groove in the rim/hub unit 10, so that a deep-well rim is produced with a deep groove receiving the tire beads 15 during a mounting of the tire.

The journal 12, which has a diameter d constructed for the occuring transverse forces and also governing the dimensioning of the antifriction bearings 13, carries on an upper end thereof a holding pin 16 having a diameter D which is larger than the diameter d of the journal 12. The holding pin 16 is inserted so that it is readily exchangeable in a clamping eye 17 arranged at the end of the supporting arm 8 and is fixed therein in a shape mating and force-derived connection.

Figure 3:
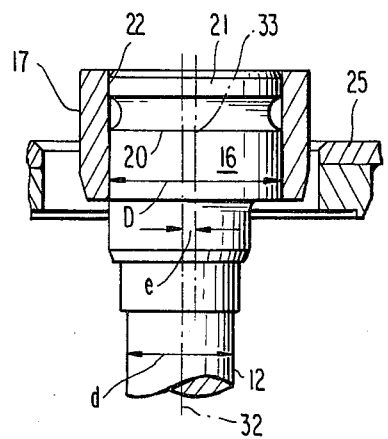
FIG. 3 is a fragmentary cross section through a mounting of a journal of the transverse guide roller arrangement of the present invention taken along the line III—III in FIG. 2.

The journal 12, having a smaller diameter d as compared to the diameter D of the holding pin 16, is arranged eccentrically at the holding pin 16 so as to be able to adjust a width or lateral position of the transverse guide roller 6 within certain limits with respect to a longitudinal axis of the vehicle 1. As shown in FIG. 3, a center 32 of the journal 12 is offset by an eccentricity e with respect to a center 33 of the holding pin 16. Thus, every transverse guide roller 6 may be adjusted in a width or lateral position by a distance equal to 2e.

The clamping eye 17 for mounting the holding pin 16 includes a sleeve rigidly held by the holding or supporting arm 8. The sleeve includes a vertically aligned cylindrical bore having a diameter which is finally adapted to a diameter of the holding pin 16. The clamping eye 17 includes a radially extending slot 18 as well as at least one tangentially extending clamping screw 19 which extends transversely across the radially extending slot 18 so that the clamping eye 17 may be clamped together and may fix the holding pin 16 in position by an appropriate force.

The clamping screw 19 is arranged at such a radial distance from a center of the clamping eye 17 that a peripheral surface of the clamping screw or bolt 19 enters the inside of the opening of the clamping eye 17 radially by about half of the diameter of the clamping screw 19. A peripheral groove 20 having a semi-circular cross section is worked or formed in the holding pin 16 at a corresponding axial position whereby, in an axial direction, a shape mating connection is established between the clamping eye 17 and the holding pin 16 so as to prevent a falling out of the holding pin 16 from the clamping eye 17.

In addition to the above-noted force-derived clamping connection, as shown in FIG. 3, a finally divided notch serration 21 may be worked or formed in a cylindrical peripheral portion of the holding pin 16 above the peripheral groove 20 for enabling a shape-mating securement of the peripheral position of the holding pin 16 and thus secure the adjusted width position of the transverse guide roller 6. The serration 21 is adapted to mesh with a corresponding counter serration 22 provided in the clamping eye 17. By lowering the holding pin 16 in the detached clamping eye 17, the serrations 21, 22 may be brought out of engagement and the holding pin 16 may be turned within the clamping eye 17. To facilitate such turning ability, a hexagon 23 is provided on a top side of the holding pin 16 in a countersunk manner by way of which turning forces may be exerted on the holding pin 16 through a wrench or the like.

To protect the antifriction bearings 13, the rim/hub unit 10, at a position above the uppermost antifriction bearing, is provided with a sealing box 27 (FIG. 2) extending approximately cylindrically. The sealing box 27 carries a sliding seal 28 which sealingly cooperates with a cylindrical surface of the journal 12. The lower antifriction bearing 13 is protected against entrance of dirt and water from an underside by a permanently screwed on sheet metal cap. To protect the sliding seal 28 from excess attack by dirt and splashing water, an emergency runner 25 is provided, on a top side of the transverse guide roller 6 in such a manner that, it is adapted to be screwed together with the upper rim horn 11, which carries, for this purpose, threaded bores and corresponding eyes. It is also possible, as indicated in phantom lines, to arrange another emergency runner on an underside of the transverse guide roller 6; however, the provision of the second emergency runner would require a de-mounting of the same if the tire 9 must be changed.

To provide an even more effective protection of the sealing means from splash water or the like a splash baffle 24 may be arranged at the holding or support arm 8 so that a top side of the emergency runner 25 and, especially the hub region of the transverse guide roller 6 is covered against direct dirt and water entrance. By means of a hinge 26, a front portion of the splash baffle 24 may be folded upwardly as shown in phantom lines in FIG. 2.

A continuous groove 29 is provided between the rim flange 11 and the sealing box 27 in order to save material and weight and also to facilitate a casting of the parts. In the zone of the groove 29, an upwardly pointing tire valve 31 of the transverse guide roller 6 is arranged in a corresponding eye. The groove 24 passes over into a central bore of the emergency runner 25. To avoid a constant attack of water on the sealing means 28, which is sensitive in this respect, the groove 29 is drained by means of a water drain pipe 30 downwardly through an interior of the tire 9 and through walls of the rim/hub unit 10. The water drain pipe 30 is sealingly installed in the walls of the rim/hub unit 10 by casting, cementing, soldering or the like. The drain pipe 30 curves along a base of the rim in correspondence with a configuration of the peripheral groove 14.

As shown in FIG. 4, a transverse guide roller generally designated by the reference numeral 6' is provided which includes a rim/hub unit 10' divided axially about a centrally disposed axis located between the antifriction bearings 13. The two parts of the rim/hub unit 10' are connected with each other by way of a flanged threaded or screw connection 14', which is hermetically sealed against a pressure loss by means of a seal 34.

The axial division of the rim/hub unit 10' considerably facilitates a mounting of the tire 9 when compared with the undivided rim/hub unit 10. The tires 9 which are very small in diameter and have still smaller tire beads which would have to be deformed to a relatively great extent to be able to be lifted over the rim flange 11 thereby leading to potential damage of the tire beads 15. However, the axial division of the rim/hub unit 10' enables an axial mounting of the tire 9. Although the bearing of the rim/hub unit 10' must be at least partially disassembled or removed for the purposes of mounting or removing a tire 9, the mounting or dismounting of the tire 9 becomes considerably simpler and faster than with an undivided rim/hub unit 10 since it is merely necessary to disassemble the lower protective cap and the lower antifriction bearing 13 and then, if two oppositely located conical roller bearings are utilized as shown in FIG. 4, the rim/hub unit 10' may be axially removed from the journal. Only the outer races of the antifriction bearings 13 remain in the rim/hub unit 10'. After the threaded connection has been taken apart, the halves of the rim/hub unit 10' may axially be removed from the tire 9 and placed on a new tire. The entire mounting process could be executed completely with tools usually found in a workshop and special devices required for carrying out complicated tire mountings with extremely small diameters become unnecessary.

To solve the water drainage problem of the groove 29 formed between the sealing box 27 and upper rim flange 11 and the hub bore of the emergency runner 25, as shown in FIG. 4, unlike the construction of FIG. 2, at least one water drainage bore 30' leading radially toward the outside is provided through the rim flange 11. Water is radially ejected toward the outside through the drainage bore 30' due to centrifugal forces. By imparting a conical configuration to the outer cross sectional contour of the groove 29 in a zone of the rim/hub 10' and above all in the zone of the bore of the hub of the emergency runner 25, it is also possible without such a water drainage bore to eject any water from the groove 29 onto a top side of the emergency runner due to the effect of centrifugal forces. During a driving of the vehicle, the transverse guide rollers 6, rather small in diameter, assume very high numbers of revolutions per unit time so that relatively high centrifugal forces may be expected.

Due to the axial division of the rim/hub unit 10' of FIG. 4, it is possible to employ, in place of a rubber tire 9 filled with compressed air, a high load bearing solid rubber tire indicated in phantom lines in FIG. 4 which may be even smaller dimensioned in its radial aspects than the corresponding stressable air tire 9. A solid rubber tire offers sufficient rolling comfort and, if the rubber hardness is appropriately selected, the solid rubber tire provides very high operating safety so that an emergency runner may, if desired, be omitted.

While we have shown and described only two embodiments in accordance with the present invention, it is understood that the same if not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A transverse guide arrangement for a vehicle adapted to be mechanically guided along a guide track, the arrangement including at least one support arm means adapted to be mounted at a wheel of the vehicle, at least one transverse guide roller means having a rim and a hub, the hub being rotatably supported on a journal adapted to be attached to an end of the supporting arm means, means for enabling an exchangeable mounting of the journal to the supporting arm means, a rubber tire adapted to be mounted on the rim, characterized in that the hub and the rim are constructionally joined to form a hollow spool-shaped body which, with its interior side, forms the hub and, with its exterior side, forms the rim.

2. An arrangement according to claim 1, characterized in that the rubber tire includes at least an approximately vertical rolling surface adapted to cooperate with the guide track when the transverse guide roller means is in an operative position.

3. An arrangement according to claim 2, characterized in that the rubber tire is an inflatable rubber tire.

4. An arrangement according to claim 2, characterized in that the rubber tire is a solid rubber tire.

5. An arrangement according to claims 3 or 4, characterized in that the hub and rim are structurally formed into one piece.

6. An arrangement according to claim 5, characterized in that two bearing means are provided at an axial space along the journal for forming a rotary bearing for the hub, and in that a portion of the wall of the hub bulges radially inwardly in a direction of the journal at a position between the bearing means so as to form a peripheral groove lying approximately centrally of the rim, the groove has a deep cross-section and is open radially toward an outside of the hub for receiving lateral beads of the tire in a manner of a deep well rim.

7. An arrangement according to claim 6, characterized in that said means for enabling the exchangeable mounting of the journal includes holding pin means formed at an upper axial extended portion of the journal, and in that means are provided for securing the holding pins means in the supporting arm means to prevent the journal from twisting and being withdrawn from the supporting arm means.

8. An arrangement according to claim 7, characterized in that said means for enabling the exchangeable mounting of the journal further includes a radially slotted clamping eye means provided on the supporting arm means for receiving the holding pin means, and in that at least one clamping means is provided for peripherally clamping the holding pin, the clamping means lies at a right angle to the slot of the slotted clamping eye means and tangentially to the clamping eye means.

9. An arrangement according to claim 8, characterized in that a peripheral groove is provided in the holding pin means at an axial location of the clamping means, the clamping means extending through the clamping eye means and radially enter the peripheral groove in the holding pin means and axially fix the holding pin means and the clamping eye means in a shape-mating relationship.

10. An arrangement according to claim 9, characterized in that the holding pin means is round and has a diameter larger than a diameter of the journal in a zone of the bearing means, and in that the holding pin means is arranged eccentrically with respect to a longitudinal center axis of the bearing means.

11. An arrangement according to claim 10, characterized in that a fine divided axially meshable serration is provided at least along a partial zone of at least one of a periphery and upper surface of the holding pin means for cooperation with a counter-serration provided in the clamping eye means, the serration and counter-serration serve to peripherally secure a portion of the holding pin means and journal in the clamping eye means.

12. An arrangement according to claim 11, characterized in that a splash baffle means is provided for covering at least a part of a top side of the transverse guide roller means.

13. An arrangement according to claim 12, characterized in that at least a portion of the splash baffle means is mounted so as to be upwardly pivotable.

14. An arrangement according to claim 13, characterized in that an emergency runner means is attached to a flange of the rim at a position above the transverse guide roller means, the emergency runner means has a diameter which is somewhat less than a diameter of the transverse guide roller means.

15. An arrangement according to claim 14, characterized in that means are disposed between a journal and holding pin means for sealing an upper one of the two bearing means, an upwardly open continuous groove is provided between the sealing means and one of a flange of the rim and the tire, and in that means are provided for draining the groove means.

16. An arrangement according to claim 15, characterized in that the draining means includes a drain pipe extending axially in a sealed manner through walls and an interior of the rim.

17. An arrangement according to one of claims 3 or 4, characterized in that two bearing means are provided at an axial spacing along the journal for forming a rotary bearing for the hub, the hub and rim are divided into two parts substantially along a transversely extending center plane of the rim and hub, and in that means are provided for sealingly detachably connecting the two parts together.

18. An arrangement according to claim 17, characterized in that the connecting means include a flanged connection extending radially toward an inside of the hub and rim between the two bearing means.

19. An arrangement according to claim 18, characterized in that said means for enabling the exchangeable mounting of the journal includes holding pin means formed at an upper axial extended portion of the journal, and in that means are provided for securing the holding pin means in the supporting arm means to prevent the journal from twisting and being withdrawn from the supporting arm means.

20. An arrangement according to claim 19, characterized in that said means for enabling the exchangeable mounting of the journal further includes a radially slotted clamping eye means provided on the supporting arm means for receiving the holding pin means, and in that at least one clamping means is provided for peripherally clamping the holding pin, the clamping means lies at a right angle to the slot of the slotted clamping eye means and tangentially to the clamping eye means.

21. An arrangement according to claim 20, characterized in that a peripheral groove is provided in the holding pin means at an axial location of the clamping means, the clamping means extending through the clamping eye means and radially enter the peripheral groove in the holding pin means and axially fix the holding pin means and the clamping eye means in a shape-mating relationship.

22. An arrangement according to claim 21, characterized in that the holding pin means is round and has a diameter larger than a diameter of the journal in a zone of the bearing means, and in that the holding pin means is arranged eccentrically with respect to a longitudinal center axis of the bearing means.

23. An arrangement according to claim 22, characterized in that a fine divided axially meshable serration is provided at least along a partial zone of at least one of a periphery and upper surface of the holding pin means for cooperation with a counter-serration provided in the clamping eye means, the serration and counter-serration serve to peripherally secure a portion of the holding pin means and journal in the clamping eye means.

24. An arrangement according to claim 23, characterized in that a splash baffle means is provided for covering at least a part of a top side of the transverse guide roller means.

25. An arrangement according to claim 24, characterized in that at least a portion of the splash baffle means is mounted so as to be upwardly pivotable.

26. An arrangement according to claim 25, characterized in that an emergency runner means is attached to a flange of the rim at a position above the transverse guide roller means, the emergency runner means has a diameter which is somewhat less than a diameter of the transverse guide roller means.

27. An arrangement according to claim 26, characterized in that means are disposed between a journal and holding pin means for sealing an upper one of the two bearing means, and upwardly open continuous groove is provided between the sealing means and one of a flange of the rim and the tire, and in that means are provided for draining the groove means.

28. An arrangement according to claim 18, further comprising
at least a screw means axially disposed for joining the two parts.

29. An arrangement according to one of claims 1, 2, or 3, characterized in that at least one emergency runner means is attached to a flange of the rim at a position above the transverse guide roller means, the emergency runner means has a diameter which is somewhat less than a diameter of the transverse guide roller means.

30. An arrangement according to claim 29, characterized in that two emergency runner means are provided, the second one of the emergency runner means is attached to a flange of the rim at a position below the transverse guide roller means.

31. An arrangement according to one of claims 3 or 4, characterized in that said means for enabling the exchangeable mounting of the journal includes a holding pin means formed at an upper axially extended portion of the journal, and in that means are provided for securing the holding pin means in the supporting arm means to prevent the journal from twisting and being withdrawn from the supporting arm means.

32. An arrangement according to claim 31, characterized in that said means for enabling the exchangeable mounting of the journal further includes a radially slotted clamping eye means provided on the supporting arm means for receiving the holding pin means, and in that at least one clamping means is provided for peripherally clamping the holding pin, the clamping means lies at a right angle to the slot of the slotted clamping eye means and tangentially to the clamping eye means.

33. An arrangement according to claim 32, characterized in that a peripheral groove is provided in the holding pin means at an axial location of the clamping means, the clamping means extending through the clamping eye means and radially enter the peripheral groove in the holding pin means and axially fix the holding pin means and the clamping eye means in a shape-mating relationship.

34. An arrangement according to claim 33, characterized in that the holding pin means is round and has a diameter larger than a diameter of the journal in a zone of the bearing means, and in that the holding pin means is arranged eccentrically with respect to a longitudinal center axis of the bearing means.

35. A transverse guide arrangement for a vehicle adapted to be mechanically guided along a guide track, the arrangement including
at least one support arm means adapted to be mounted at a wheel of the vehicle,
at least one transverse guide roller means comprising a hub, the hub being rotatably supported on a journal adapted to be attached to an end of the supporting arm means,
means for enabling an exchangeable mounting of the journal to the supporting arm means, wherein the hub comprises
means for forming a rim from a portion of the hub adjacent the journal, said transverse guide roller means further comprising a rubber tire adapted to be mounted on the rim.

* * * * *